(12) United States Patent
Kemp (10) Patent No.: US 10,760,820 B2
(45) Date of Patent: Sep. 1, 2020

(54) CONDENSING BOILER

(71) Applicant: Brendan Kemp Boiler Design Limited, Kent (GB)

(72) Inventor: Brendan Kemp, Kent (GB)

(73) Assignee: BKBD Limited, Kent (GB)

(\*) Notice: Subject to any disclaimer, the term of this patent is extended or adjusted under 35 U.S.C. 154(b) by 0 days.

(21) Appl. No.: 15/660,782

(22) Filed: Jul. 26, 2017

(65) Prior Publication Data

US 2018/0031276 A1 Feb. 1, 2018

(30) Foreign Application Priority Data

Jul. 28, 2016 (GB) .................................. 1613022.1

(51) Int. Cl.
| | |
|---|---|
| *F24H 9/00* | (2006.01) |
| *F24H 1/43* | (2006.01) |
| *F24H 1/40* | (2006.01) |
| *F28D 7/02* | (2006.01) |
| *F24H 8/00* | (2006.01) |
| *F24H 1/18* | (2006.01) |
| *F24H 1/44* | (2006.01) |

(52) U.S. Cl.
CPC .............. *F24H 9/001* (2013.01); *F24H 1/181* (2013.01); *F24H 1/406* (2013.01); *F24H 1/43* (2013.01); *F24H 1/445* (2013.01); *F24H 8/00* (2013.01); *F24H 9/0047* (2013.01); *F28D 7/026* (2013.01); *Y02B 30/102* (2013.01)

(58) Field of Classification Search
CPC ....................................................... F24H 9/001
See application file for complete search history.

(56) References Cited

U.S. PATENT DOCUMENTS

| | | | | |
|---|---|---|---|---|
| 4,348,360 A | * | 9/1982 | Chang ...................... | B01J 35/04 422/122 |
| 4,449,485 A | * | 5/1984 | Tan .......................... | F22B 7/04 122/209.1 |
| 4,505,419 A | * | 3/1985 | Steeb ..................... | B23K 1/0014 228/183 |
| 4,869,317 A | * | 9/1989 | Jubb ...................... | F28D 9/0043 165/166 |

(Continued)

FOREIGN PATENT DOCUMENTS

| | | |
|---|---|---|
| CN | 102840780 | 12/2012 |
| EP | 0495973 A1 | 7/1992 |

(Continued)

*Primary Examiner* — Nathaniel Herzfeld
(74) *Attorney, Agent, or Firm* — Fogg & Powers LLC (57) ABSTRACT

The invention provides a condensing boiler 100 including a heat exchanger 160, the heat exchanger including at least one fluid flow cassette 162a, 162b, 163a, 163b, 164a, 164b, each cassette comprising first 181 and second 182 sheets, wherein at least the first sheet has corrugations 185, 186, 187 along a length of the sheet so as to form a number of grooves extending across a width of the sheet, wherein the second sheet is attached against the first sheet so as to enclose the grooves to form a number of fluid flow passageways 193 extending across a width of the cassette in between the first and second sheets, and wherein the cassette is substantially curved across its width such that the fluid flow passageways are substantially curved along their length. The invention also provides a method of manufacturing a heat exchanger or condensing boiler.

25 Claims, 5 Drawing Sheets

(56) References Cited

U.S. PATENT DOCUMENTS

| | | | | |
|---|---|---|---|---|
| 5,138,765 A * | 8/1992 | Watson | ................ | B21D 53/045 |
| | | | | 29/457 |
| 5,276,966 A * | 1/1994 | Grant | ...................... | B21C 37/06 |
| | | | | 228/157 |
| 5,568,835 A * | 10/1996 | LaCount | ................. | F28D 7/026 |
| | | | | 165/140 |
| 5,733,451 A * | 3/1998 | Coellner | ................ | B01D 53/02 |
| | | | | 210/496 |
| 6,666,173 B2 * | 12/2003 | Dick | ........................ | F24H 1/43 |
| | | | | 122/18.1 |
| 7,191,824 B2 * | 3/2007 | Wu | ..................... | F02B 29/0462 |
| | | | | 165/141 |
| 2016/0334137 A1 * | 11/2016 | Pisani | ...................... | F24H 1/40 |

FOREIGN PATENT DOCUMENTS

| | | |
|---|---|---|
| EP | 0495973 A1 | 7/1992 |
| FR | 3025303 | 3/2016 |
| GB | 2089692 | 6/1982 |
| JP | S54102649 | 8/1979 |
| WO | WO 9514895 A1 * 6/1995 ............. F24H 1/282 |

\* cited by examiner

CONDENSING BOILER

BACKGROUND OF THE INVENTION

The present disclosure relates to an improved condensing boiler.

The present invention concerns condensing boilers. More particularly, but not exclusively, this invention concerns a condensing boiler including a heat exchanger. The invention also concerns a method of manufacturing a heat exchanger or condensing boiler.

Heat exchangers may be made from corrugated sheets to form cassettes. Water or flue gases are able to flow in the channels formed in the corrugations so as to transfer heat with the water of flue gases outside of the channels. Such cassettes are often rectangular. There may be significant limescale and debris build-up in the channels, causing negative effects on heat transfer performance of the heat exchanger.

The present invention seeks to mitigate the above-mentioned problems. Alternatively or additionally, the present invention seeks to provide an improved condensing boiler.

SUMMARY OF THE INVENTION

The present invention provides, according to a first aspect, a condensing boiler including a heat exchanger, the heat exchanger including at least one fluid flow cassette, each cassette comprising first and second sheets, wherein at least the first sheet has corrugations along a length of the sheet so as to form a number of grooves extending across a width of the sheet, wherein the second sheet is attached against the first sheet so as to enclose the grooves to form a number of fluid flow passageways extending across a width of the cassette in between the first and second sheets, and wherein the cassette is substantially curved across its width such that the fluid flow passageways are substantially curved along their length.

Having the cassette being substantially curved across its width means that the cassettes can be placed near to the sides of a boiler that has curved sides. For example, the cassettes could be more efficiently packed inside a cylindrical boiler, than rectangular cassettes could. This means that more cassettes could be fitted in, increasing heat transfer and the efficiency of the boiler. It also allows for the fluid flow and heat transfer within the boiler to be better organised, and simpler. In addition, the fluid flow passageways being curved along their length provides a greater surface area for heat transfer.

In addition, having curved walls on the cassettes helps maintain the fluid flow in the fluid flow passageways in a "tumbling" or turbulent form. This prevents limescale and other deposits building up and attaching to the passageway walls. This is because there is no flat surface for the limescale/debris to cling to.

Also, the curved nature of the passageways provides a "self-scrubbing" cleaning effect of the flow, as the fluid flow in an outer portion of the bend moves faster than fluid flow in an inner portion of the bend.

It is also noted that having passageways that extend in a substantially vertical direction means that the flow is either flowing with or against gravity. This also prevents limescale/deposit build up as the limescale/deposits (or sediments or particles) have nowhere to settle along the length of the passageways. This is in contrast to horizontally extending passageways where the limescale/deposits may settle at the bottom of the passageways along their length.

It may be that there may be no need to provide the boiler in a heat exchanger arrangement with an existing heating system, in order to provide it with clean fluid. Instead, it may be connected directly to an existing heating system. The above features prevent the debris/limescale in the existing system settling and building up in the boiler of the invention.

The flow speed of the fluid flow in the fluid flow passageways may be carefully controlled in use to provide a required amount of non-smooth flow whilst maintaining a sufficient pressure and allowing for sufficient time for effective heat transfer. The fluid flow speed may be between 1 and 2 feet (30.5 and 61 cm) per second, for example. Preferably, the fluid flow speed is approximately 1.5 feet (46 cm) per second. Having a number of fluid flow passageways allows for a high fluid flow velocity in the passageways, which causes turbulence and increases heat transfer as well as ensuring the pressure losses of the boiler system remains as low as possible.

Flames are cylindrical in form and therefore the heat exchanger must be generally of cylindrical form to ensure even heat exchange on all heating surfaces. Ensuring that the flame front is an even distance away from heating surfaces helps to minimise the risk of hot spots within the boiler which would cause the metal to degrade. This also helps to avoid flame impingement within the heat exchanger.

Of course, the first and second sheets may not be in direct contact with each other when attached against each other. For example, there may be a gasket, or other kind of seal in between them.

The corrugations mean that the outside flow is kept in turbulent flow. This is an important factor to ensure maximum heat transfer by "scrubbing" effect to increase the heat transfer. This enables the boiler to be fully condensing over the entire firing range.

Preferably, the two sheets are attached together by welding. This is much easier for the corrugated design described above, as opposed to for cylindrical/rounded cross-sectional passageways, which have a minimal point of contact when compared to a flat surface.

Preferably, the cassette is curved with a constant radius of curvature so as to form part of a curved side of a cylinder. This allows the cassette to be efficiently packed in a cylindrical boiler.

More preferably, the width of the cassette corresponds to approximately half the circumference of the curved cylinder side. This allows for one cassette to be located on one side of a cylindrical boiler and another cassette to be placed on the opposite side of the boiler.

Even more preferably, the width of the cassette corresponds to between 100% and 80% of half the circumference of the curved cylinder side. This allows a space for a number of fluid flow connectors (for connecting fluid flow passageways in different cassettes) within the circumference formed with the cassettes.

Preferably, the second sheet of the cassette also has corrugations along a length of the second sheet so as to form a number of grooves extending across a width of the second sheet. This provides for the resulting fluid flow passageways to have a greater surface area and so greater heat transfer leading to improved boiler efficiency.

The large amount of surface area helps minimise the heat release rate (the amount of heat going into the fluid per surface area) required.

More preferably, the second sheet of the cassette is attached against the first sheet so that the adjacent corrugations of the first and second sheets substantially correspond, such that the formed fluid flow passageways extending across the width of the cassette in between the first and second sheets are defined by corrugations of both the first and second sheets. Thus, the surface area of each passageway is defined by the corrugated shape of both sheets.

Even more preferably, the adjacent corrugations of the first and second sheets are substantially mirror images of each other along the length of the corrugations, such that the cross-sections of the formed fluid flow passageways are symmetrical. This allows the first and second sheets to be manufactured using a similar or identical moulding, casting, rolling or pressing apparatus and makes manufacture simpler. For example, the first and second sheets may be substantially identical, with the second sheet being upside down relative to the first sheet.

Preferably, the corrugations each comprise a cross-section with a substantially flat portion at a second level, the second level being offset from a first, non-corrugated level of the sheet. This provides the sheets with corners and a required rigidity, whilst also providing a large surface area of the passageways in contact with the boundary layer inside the passageways. The rigidity of the design allows a thinner material to be used. The spacing of the flat portions at the second level may be sized to provide a suitable pressure drop of the flue gases across the boiler. The corners provide for the flue gases to be kept turbulent and so increasing "scrubbing" and heat transfer.

More preferably, the cross-section of each corrugation also comprises two further straight sides extending from the flat portion to the first level of the sheet, such that the cross-section is in the shape of a trapezium. Here is it noted, that "trapezium" here means a shape with a flat top and parallel flat bottom, with straight sides (British definition). Here, the flat top corresponds to the flat portion at the second level of the sheet, the flat bottom corresponds to the first level of the sheet under the flat top and the sides correspond to the straight sides extending from the flat portion to the first level of the sheet.

Preferably, in between the corrugations, the cross-sections of the sheets are substantially flat. This allows for the first and second sheets to be easily attached together at these flat sections.

Such a hexagonal profile, and the corrugations, offers benefits for performance by offering a larger useful heating transfer surface area when compared to a circle. The shape also enables the heating transfer surface to be equally spaced around the flame of the boiler. It also allows for even heat distribution within the boiler. This prevents limescale precipitation and thus prevent local boiling (kettling). In addition, the shape enables the length of the boiler to be shorter for the same heat release and transfer, compared to a standard straight tube. The corrugation help ensure that the gas flow outside the passageways is more turbulent, than for standard cylindrical tubes. In addition, complete sealing between the fluid flow and gas sides is achieved much more easily than for standard cylindrical tubes.

The design of the hexagonal shape including the flat portions is a fully symmetrical shape, meaning that manufacture is made simpler and repeatable. The outer flat portions of the hexagonal shape are advantageous for rolling to the specified radius when compared to a circle.

Preferably, the boiler is suitable for use with both gas and oil as fuel for the burner.

Preferably, the first and/or second sheets are metallic, preferably comprising stainless steel. Conventional boilers tend to use mild steel, cast iron or cast aluminium.

Preferably, the sheets are between 0.9 mm and 2.5 mm thick, more preferably between 1.1 mm and 1.6 mm thick, even more preferably approximately between 1.2 mm and 1.4 mm thick. This is much thinner than conventional material thickness in boiler passageways, which may be in the region of 5 to 10 cm thick. The thin material provides a lower temperature gradient over the thickness of the material in use. This enables a large heat transfer whilst also keeping the skin temperature low. This helps to prevent localised boiling occurring. Also, having thinner walls keeps the materials costs low and allows a high quality wall material (e.g. steel) to be used so the same overall cost, compared to having thicker walls. For example, the temperature of the walls of the passageway on the "flame side" may only be 200° C. This means the temperature is much lower (compared to perhaps 400° C. in a conventional boiler) and further away from the "working limit" of the stainless steel (about 1000° C.). This reduces the need for replacement of the material providing the passageways and maintenance requirements of the boiler. This is especially important when the passageways are subjected to limescale/debris (e.g. oil) deposits on the walls, as this increases the temperature of the walls during boiler use. Having a lower skin temperature also lowers the NOx emissions.

Preferably, the heat exchanger comprises a plurality of such cassettes and a number of fluid flow connectors connecting a fluid flow passageway in a first cassette to a fluid flow passageway in a second cassette.

More preferably, the fluid flow connectors are arranged to reverse the flow of the fluid such that the fluid is able to flow out of the first cassette in one direction, through a fluid flow connector and then flow into the second cassette in substantially the opposite direction. This helps to keep the flow turbulent and so further helps to prevent limescale/debris build up, as described earlier. This is because any sediment in the fluid flow is held in suspension and does not settle.

It is very important that fluid flow on the return into the boiler is passed through the outer cassette first. As the fluid is at its lowest temperature at this point, it is able to absorb more heat from the already "cooled" exhaust gases (on the last pass of the gases). This ensures maximum condensing and increased efficiencies for the boiler. This helps to achieve a low exhaust temperature of less than 100 degrees C. which allows for full condensation back into the boiler. This increases boiler efficiency due to hydrogen recovery and latent heat gain back into the boiler, as opposed to being emitted out the boiler flue.

Preferably, the boiler is substantially in the form of a cylinder and comprises 3 such cassettes stacked adjacent a first side of the cylinder and 3 such cassettes stacked adjacent a second opposite side of the cylinder.

The boiler may be used with an operating temperature difference as low as 11 degrees C. between the flow and return. The boiler may be used to condense at a fluid flow (water) temperature as high as 90 degrees C.

According to a second aspect of the invention there is also provided a method of manufacturing a heat exchanger or condensing boiler, the method comprising the following steps: providing a first sheet with corrugations along its length so as to form a number of grooves extending across a width of the sheet, and attaching a second sheet against the first sheet so as to form a cassette and to enclose the grooves to form a number of fluid flow passageways extending across a width of the cassette in between the first and second sheets, wherein the cassette is substantially curved across its width such that the fluid flow passageways are substantially curved along their length.

The sheets and/or cassettes may be formed by profiling (to form the corrugations) and rolling (to form the curved shape), which provides a strong construction.

It will of course be appreciated that features described in relation to one aspect of the present invention may be incorporated into other aspects of the present invention. For example, the method of manufacture of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
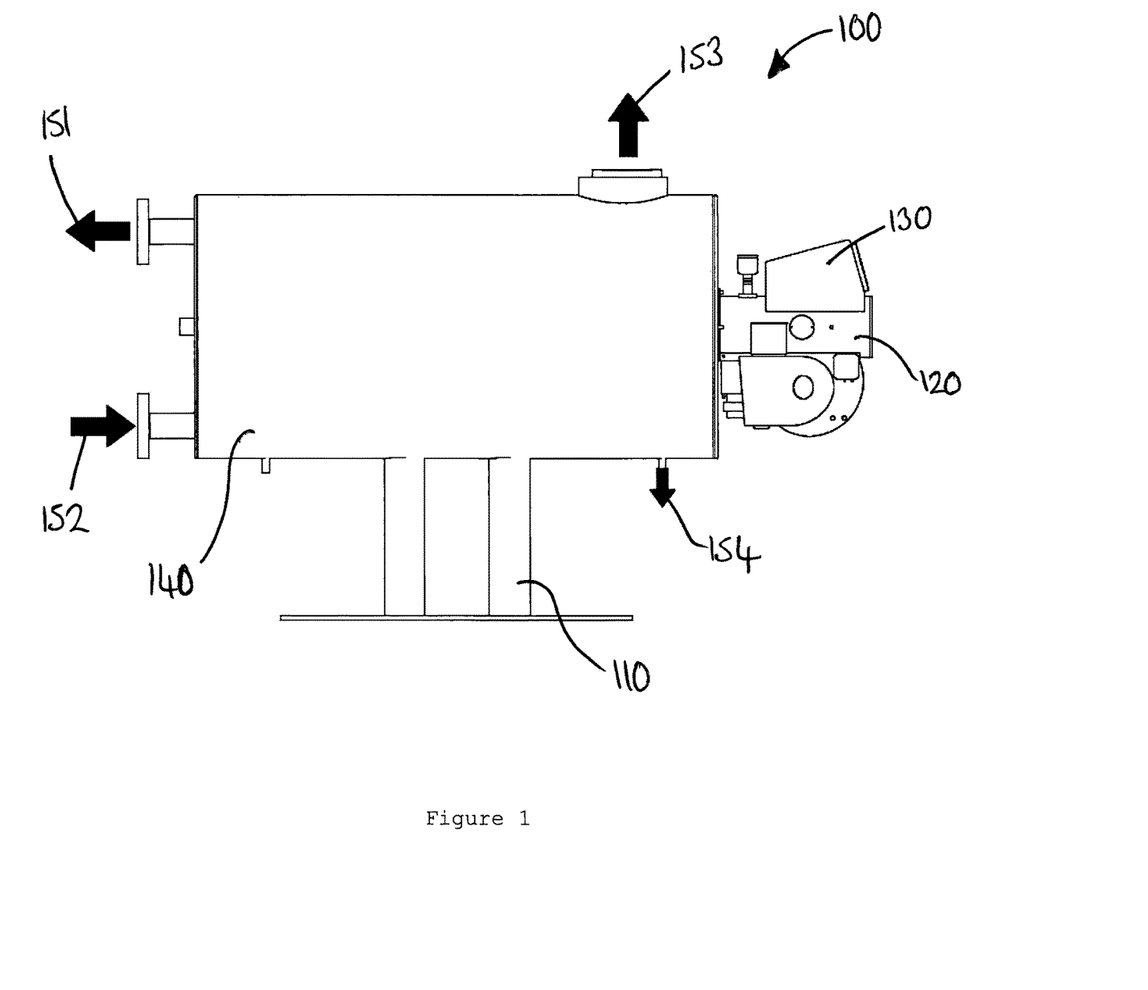
FIG. 1 shows a side view of a condensing boiler according to a first embodiment of the invention.

FIG. 1 shows a side view of a condensing boiler 100 according to a first embodiment of the invention.

The condensing boiler 100 comprises a cylindrical heat exchanger unit 140 on a stand 110. The stand 110 has two legs and allows the boiler to be raised off the ground. At one end (right end as shown in FIG. 1) of the cylindrical heat exchanger unit 140 is the burner 120 for the boiler 100 and a control unit 130.

The cylindrical heat exchanger unit 140 itself has four inlet/outlets 150, as follows:

- A water return inlet 152 for receiving water to be heated by the boiler. The water return inlet 152 is located towards the bottom of the cylindrical heat exchanger unit 140 on the opposite side to the burner 120 and control unit 130.
- A water flow outlet 151 for providing water that has been heated by the boiler. The outlet 151 is located above the water return inlet 152, also on the opposite side of the cylindrical heat exchanger unit 140 to the burner 120 and control unit 130.
- A flue/exhaust gases outlet 153 for expelling waste/flue gases from the combustion process. The flue outlet 153 is located at the top of the cylindrical heat exchanger unit 140 towards the end where the burner 120 and control unit 130 are.
- A condensate outlet 154 for allowing condensate to drip out of the boiler. The outlet 154 is located on the underside of the cylindrical heat exchanger unit 140, opposite the flue outlet 153. When condensing occurs, the condensate runs around the outermost cassette 162 and exits the boiler through the condensate outlet 154. The condensate should be drained from the boiler to dedicated drains.

Figure 2:
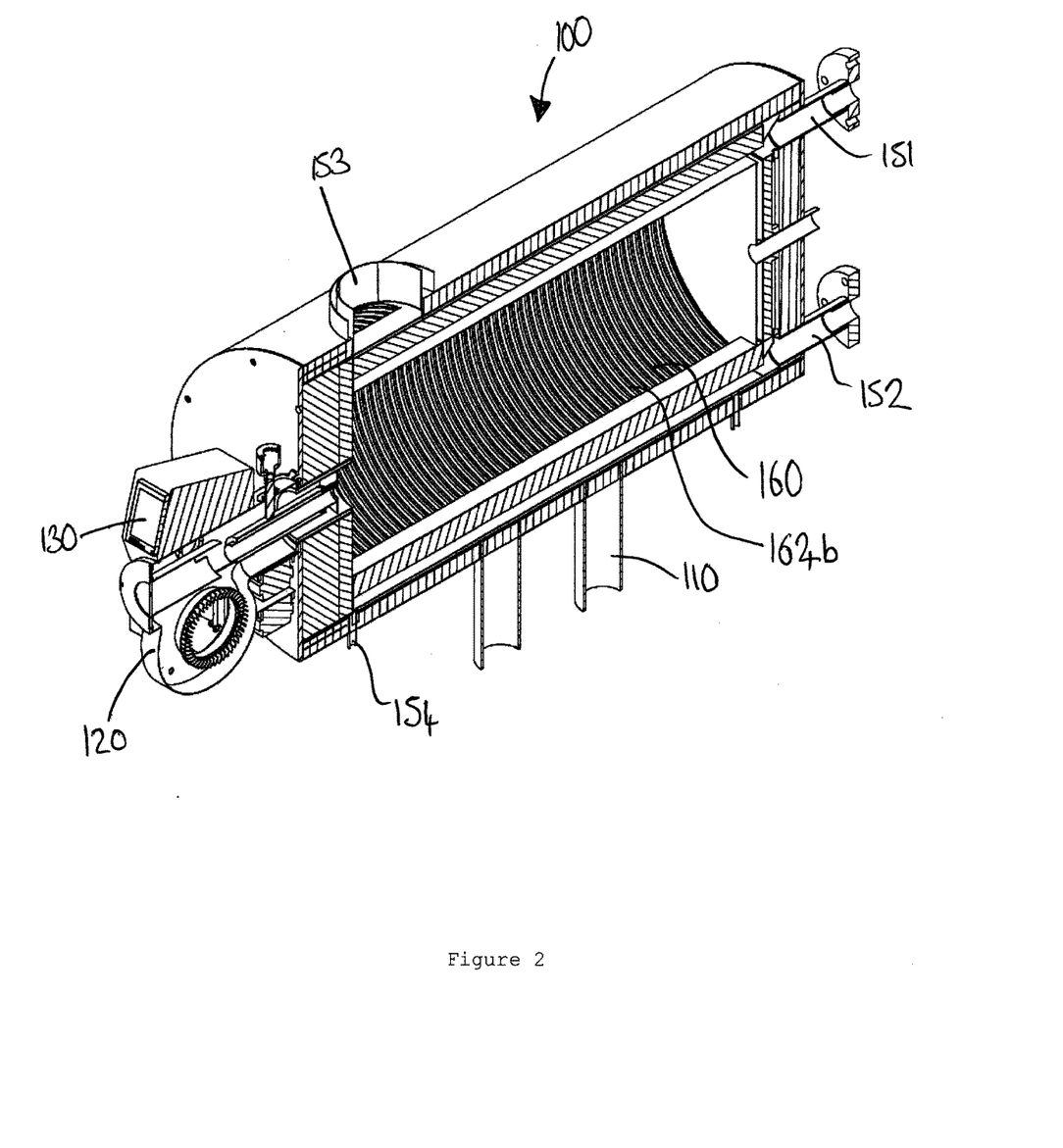
FIG. 2 shows an internal cutaway view of the condensing boiler of FIG. 1.

FIG. 2 shows an internal cutaway view of the condensing boiler 100 of FIG. 1. Here, it can be seen that there is a heat exchanger 160 within the cylindrical heat exchanger unit 140 and that it is curved to match the curved internal shape of the cylindrical heat exchanger unit 140. The various inlets and outlets 150 (151, 152, 153 and 154) are also seen in more detail here.

Figure 3:
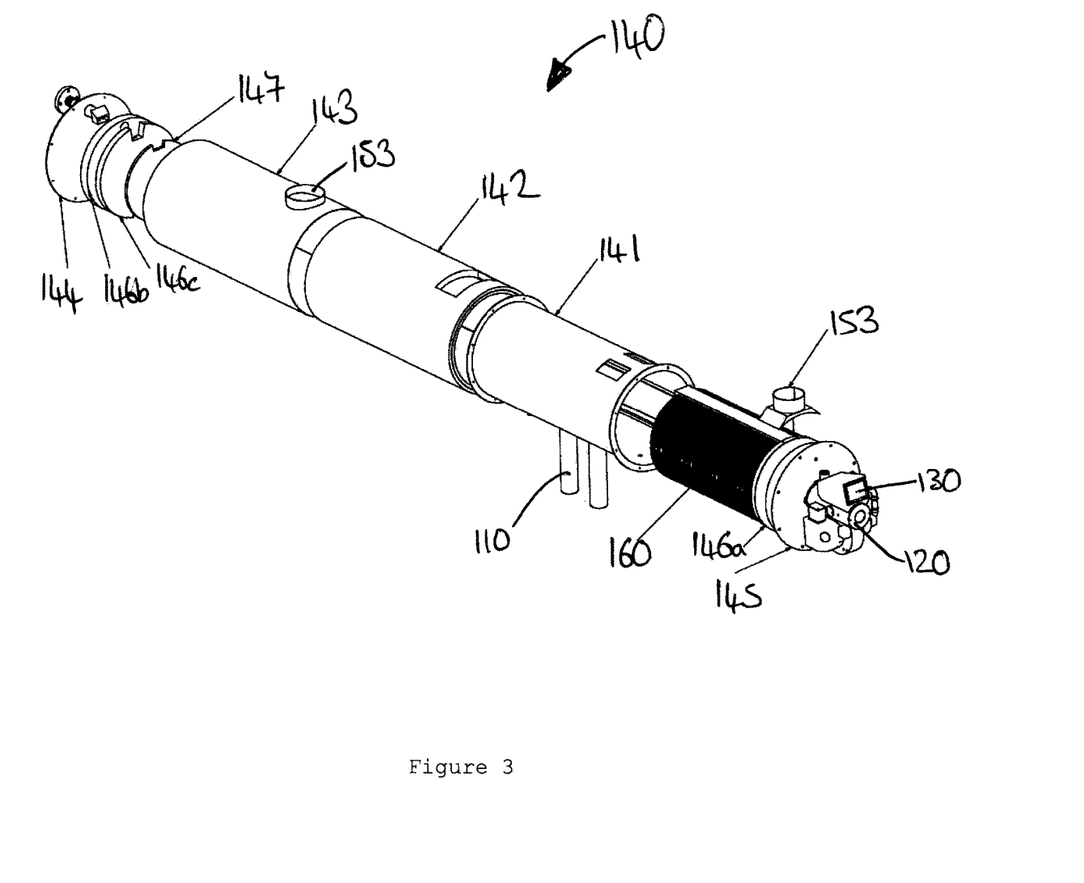
FIG. 3 shows an exploded view of the condensing boiler of FIG. 1.

FIG. 3 shows an exploded view of the cylindrical heat exchanger unit 140. The unit 140 comprises a cylindrical inner shell 141, surrounded on its outside by a cylindrical lagging layer 142 and then a cylindrical outer shell 143. Inside the inner shell 141 is the heat exchanger 160. At the right (front) end of the unit 140 is a front plate upon which the burner 120 and control unit 130 are mounted. Inside the front plate 145 is an insulating layer 146a. Similarly, at the left (back) end of the unit 140 is a back plate 144. Inside the back plate 144 are insulating layers 146b and 146c. Inside of the insulating layers 146b, 146c is a wet back plenum 147.

Figure 4:
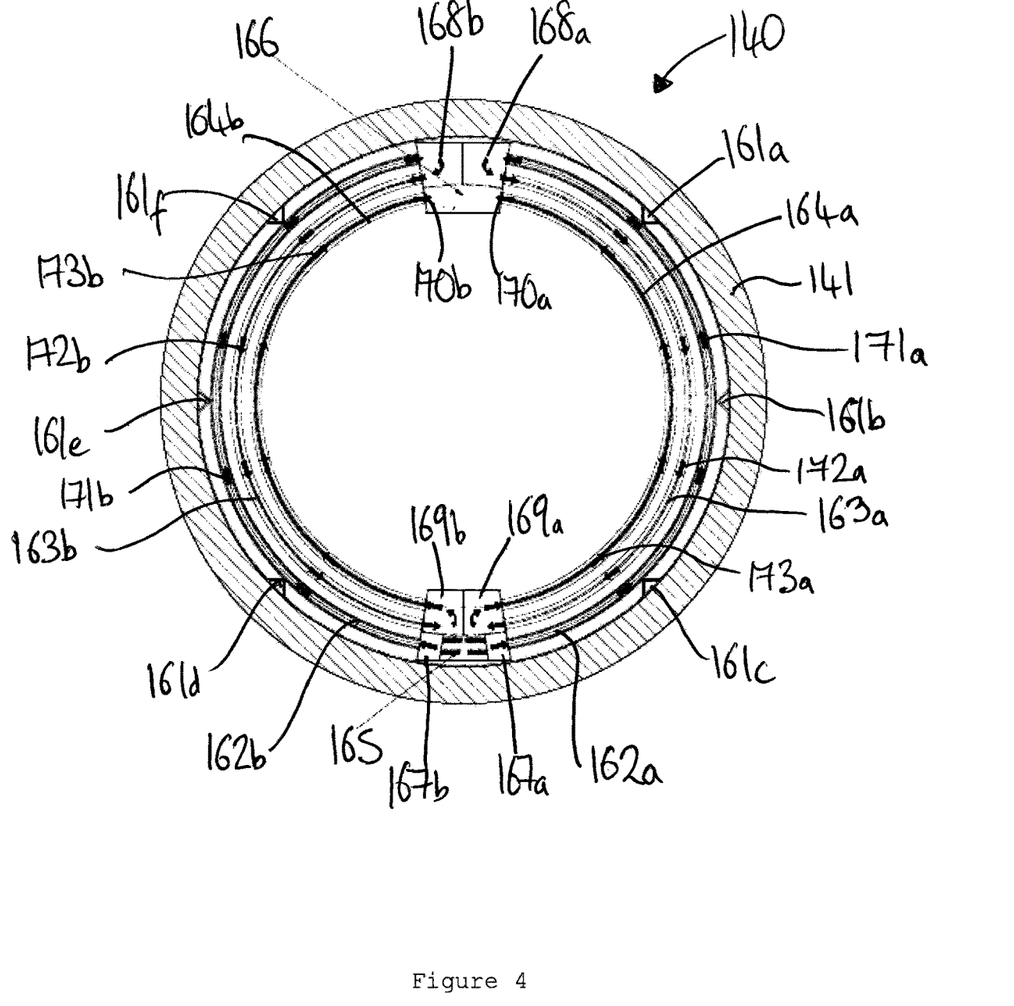
FIG. 4 shows an end sectioned view showing the heat exchanger of the condensing boiler of FIG. 1.

FIG. 4 shows an end section view showing the heat exchanger 160, surrounded by the inner shell 141. The heat exchanger 160 comprises six cassettes; three are placed against a right hand side of the cylinder (162a, 163a, 164a) and three are placed against the left hand side (162b, 163b, 164b). In the following, only the cassettes (162a, 163a, 164a) and the water flow on the right hand side will now be described, with the cassettes (162b, 163b, 164b) and water flow on the left hand side being a mirror image on those on the right hand side.

Each cassette has a length extending the length of the internal volume of the cylindrical unit 140 and a width that is curved to correspond to the curved internal sides of the unit 140. In the end view of FIG. 4, it can be seen that each cassette has the same curved shape of the internal wall of the inner shell 141. Each cassette comprises a number of channels distributed along the length of the cassette so that each channel extends along the width of the cassette, as will be described in more detail later.

At the bottom centre of the unit 140 is a first water connector 165. Similarly, at the top centre of the unit 140 is a second water connector 166.

Looking at the first water connector 165, this comprises two horizontal sections; bottom "return in" section 167 and top "second reversal section" 169. The top "second reversal section" 169 will be described later. The bottom "return in" section 167 receives the water from the water return inlet 152. The water is then sent two ways; right via the right hand side 167a of the section 167 and left via the left hand side 167b of the section 167.

In the end view of FIG. 4, it can be seen that an outermost cassette 162a is spaced apart from the shell 141 by three spacers 161a, 161b and 161c (there are similarly three spacers 161d, 161e, 161f on the left hand side of the cylinder 140).

The water sent right via the right hand side 167a of "return in" section 167 of the first water connector 165 is connected to the bottom of the outermost cassette 162a such that the water flows upwards (see flow 171a) along the outermost cassette to the second water connector 166 at the top of the outermost cassette 162a.

The second water connector 166 comprises two horizontal sections; bottom "flow out" section 170 and top "first reversal section" 168. The bottom "flow out" section 170 will be described later. A right hand side 168a of the top "first reversal section" 168 receives the water from the top of the outermost cassette 162a. (Similarly, a left hand side 168b of the top "first reversal section" 168 receives water from the top of the outermost cassette 162b on the left hand side.)

The water is then reversed and fed into a top of a middle cassette 163a, such that the water flows downwards (see flow 172a) along the middle cassette to the first water connector 165 at the bottom of the middle cassette 163a.

The middle cassette 163a is very similar in shape to the outermost cassette 162a except that it is placed inside, but spaced apart from, the outermost cassette.

The flow 172a from the middle cassette flows into a right hand side 169a of the top "second reversal section" 169 of the first water connector 165. The water is then reversed and fed into a bottom of an innermost cassette 164a, such that the water flows upwards (see flow 173a) along the innermost cassette to the second water connector 166 at the top of the innermost cassette 163a.

The innermost cassette 164a is very similar in shape to the middle and outermost cassettes 162a, 163a except that it is placed inside, but spaced apart from, the middle cassette.

The flow 173a from the inner most cassette flows into a right hand side 170a of the bottom "flow out" section 170 of the second water connector 166. At this point water is also allowed to flow into the wetback plenum 147 meaning equal flow distribution within the cassettes and the wetback plenum, ensuring even heat transfer. This ensures that the maximum amount of heat is transferred into the water from the hottest point within the boiler (furnace) before the water leaves the boiler. This wetback plenum 147 also acts as a cooling device at the rear of the boiler meaning that a lesser amount of insulation is required. By using a wetback plenum in place of a refractory wall at the end of the furnaces enables the boiler to run with lower NOx emissions.

From here the water flows out of the water flow outlet 151.

Figure 5:
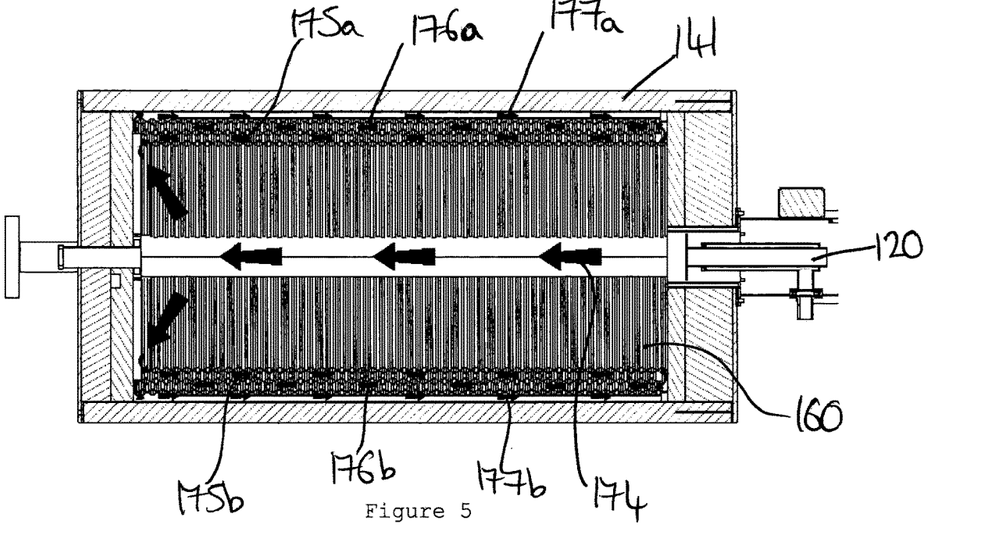
FIG. 5 shows a side sectioned view showing gas paths in the heat exchanger.

FIG. 5 shows a side sectioned view showing gas paths in the heat exchanger 160. From here it can be seen that waste gases from the combustion process are fed along a central path 174 along the length of the cylindrical heat exchanger unit 140. They then flow into the gaps between the cassettes.

In particular, FIG. 5 shows the gas flow through the right hand cassettes, described in relation to FIG. 4.

Here, it can be seen that the gases flow through the gap 175a between the innermost cassette 164a and the middle cassette 163a (from the left hand side to the hand side in FIG. 5). It is noted that the innermost cassette 164a abuts the inner side of the front plate 145 at the "burner 120 end" of the cylinder and hence, the waste gases only access the gap 175a at the opposite (non-burner) end of the cylinder. It is also noted that the middle cassette 163a abuts the inner side of the wetback 147 at the non-burner end of the cylinder and so the waste gases are forced down the gap 175a in between the innermost and middle cassettes.

Once the waste gases reach the right (front/burner) end of the cylinder, they are reversed around the middle cassette 163a (as it does not abut the front plate 145) and then through the gap 176a between the middle cassette 164a and the outermost cassette 162a (from the right hand side to the left side in FIG. 5).

Finally, the gases are reversed around the outermost cassette 162a and pass through the gap 177a between the outermost cassette 162a and the inner shell 141 (from the left hand side to the right hand side in FIG. 5).

Of course similar flow in between the cassettes can be seen (designated by 175b, 176b, 177b) towards the bottom of the cylinder 140. Flow also occurs along the entire height of the cylinder 140 (i.e. the entire width of the cassettes). Similar flow also occurs for the left hand side cassettes (not shown in in FIG. 5).

Figure 6:
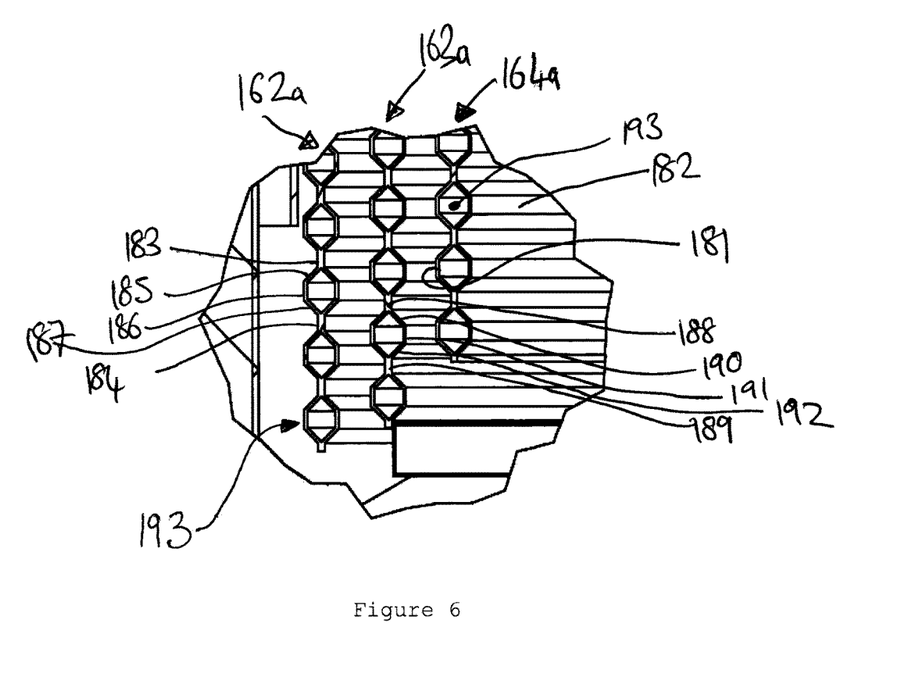
FIG. 6 shows an enlarged view of parts of three cassettes of the heat exchanger.

FIG. 6 shows an enlarged view of parts of the three cassettes 162a, 163a, 164a of the heat exchanger 160. Here it can be seen that each cassette is made from two sheets, both of which are corrugated, and placed together to form hexagonal channels 193 for the water to flow in. More specifically, the first sheet is designated as the sheet 181 on the left hand side of each cassette, as shown (labelled on the innermost cassette 164a). The second sheet is designated as the sheet 182 on the right hand side of each cassette, as shown (labelled on the innermost cassette 164a).

The corrugation pattern of the first sheet of the outermost cassette 162a is shown. The sheet has a first flat portion 183, a corrugated pattern 185, 186, 187 and then a second flat portion 184. The corrugated pattern comprises an outwardly (from the second sheet) slanted portion 185, a flat portion 186 substantially parallel to the first and second flat portions 183, 184 and an inwardly (to the second sheet) slanted portion 187. This pattern repeats to form one side of the cassette 162a.

The corrugation pattern of the second sheet of the middle cassette 163a is shown and is a mirror image of the first sheet described above. The second sheet has a first flat portion 188, a corrugated pattern 190, 191, 192 and then a second flat portion 189. The corrugated pattern comprises an outwardly (from the first sheet) slanted portion 190, a flat portion 191 substantially parallel to the first and second flat portions 188, 189 and an inwardly (to the first sheet) slanted portion 192. This pattern repeats to form the other side of the cassette 163a.

During manufacture, the corrugated sheets are first folded from flat stainless steel sheet to form corrugated sheets in flat form. Two identical sheets are then mirrored and spot welded together in multiple places along the width and length of the flat corrugated sheets. These spot welds are located at the flat portions 183, 184 and 188, 189 of the corrugations. Mirroring and spot welding the two corrugated sheets together forms the passageways that fluid can flow in. Joined ends of the sheets are then fully welded along the width of the sheets on both ends. Each cassette is then rolled to the specified radius to form a curved cassette. A total of six cassettes are formed in the same way as described above but with varying rolled radii to suit the three different tiers of cassettes.

The stainless steel used may be 316L stainless steel. It may also be any of the following stainless steels: 304L, 316, 316LN, 316Ti, 316LVM, 310 or any other suitable stainless steel or other material.

In particular, the material chosen should ideally be water corrosion resistant and resistant to flame erosion from natural gas and diesel oil, if both of those are desired to be used with the boiler. In addition, for diesel oil use, the material should be resistant to dilute sulphuric acid (produced when firing with diesel oil). The material may be chosen to not have any molecular changes below, for example 800 degrees C.

The six cassettes are then fully welded into the flow connectors 165 and 166 to form a cassette assembly and then placed inside the heat exchanger unit 140, with the various shells, insulating layers and front and back walls. The insulating layers provide good insulation and allow the boiler to have low standing losses of 0.06%.

If replacement of the cassette assembly is required, this can be done by exchanging the cassette assembly for a similar cassette assembly.

In use, the waste gases produced by the combustion process in the burner 120 are fed down paths 174, 175a, 176a, 177a etc. As they do so, they pass the cassettes 1602a, 162b, 163a, 163b, 164a, 164b. At the same time, water is fed in a water return inlet 152 and passes up and down the channels 193 of the various cassettes, as previously described. Hence, the water is able to heat exchange with the waste gases so as to reduce the heat energy of the waste gases leaving the boiler 100 by the flue/exhaust gases outlet 153. The water that leaves the boiler 100 by a water flow outlet 151 has taken some of this heat energy.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The stand may only have one leg.

There may be more than one condensate outlet, for example one at the front and one at the rear of the boiler.

The corrugations in the sheets may be formed into any suitable shape.

The boiler may be provided with flue gas recirculation (FGR). In this example, a duct is used to take the exhaust gases from a flue at the front of the boiler and introduce them into the burner by a control valve. This lowers NOx emissions as it starves the flame of nitrogen.

The boiler may also be provided with pre-heated air (to boost efficiency). In this example, the outer shell is adapted to allow combustion air to flow through holes and along the outside of the fourth pass of the boiler. This heats the combustion air before it enters the burner.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A condensing boiler including a heat exchanger unit, the heat exchanger unit comprising:
a heat exchanger within the heat exchanger unit, wherein the heat exchanger comprises at least first, second and third fluid flow cassettes, each fluid flow cassette including,
first and second sheets,
wherein at least each of the first sheets has corrugations along a length of the sheet so as to form a number of grooves extending across a width of the sheet,
wherein each of the second sheets is attached against the first sheet so as to enclose the grooves to form a number of fluid flow passageways extending across a width of the fluid flow cassette in between the first and second sheets,
wherein each fluid flow cassette is substantially curved across its width such that the fluid flow passageways are substantially curved along their length, and
wherein the first cassette and the third cassette are configured to abut a first end of the heat exchanger unit and wherein the second cassette is configured to abut a second, opposite end of the heat exchanger unit,
wherein gas to be cooled by the heat exchanger flows along a length of the heat exchanger in a gap between the first and second fluid flow cassettes in a first direction and between the second and third fluid flow cassettes in a second opposite direction, and wherein gas flow is reversed around the second fluid flow cassette.

2. The condensing boiler as claimed in claim 1, wherein each fluid flow cassette is curved with a constant radius of curvature so as to form part of a curved side of a cylinder.

3. The condensing boiler as claimed in claim 2, wherein the width of each fluid flow cassette corresponds to approximately half the circumference of the curved cylinder side.

4. The condensing boiler as claimed in claim 3, wherein the width of each fluid flow cassette corresponds to between 100% and 80% of half the circumference of the curved cylinder side.

5. The condensing boiler of claim 2, wherein the second sheet of each fluid flow cassette is attached against the first sheet so that the adjacent corrugations of the first and second sheets substantially correspond, such that the formed fluid flow passageways extending across the width of the fluid flow cassette in between the first and second sheets are defined by corrugations of both the first and second sheets.

6. The condensing boiler of claim 5, wherein the adjacent corrugations of the first and second sheets are substantially mirror images of each other along the length of the corrugations, such that the cross-sections of the formed fluid flow passageways are symmetrical.

7. The condensing boiler of claim 1, wherein the corrugations each comprise a cross-section with a substantially flat portion at a second level, the second level being offset from a first, non-corrugated level of the sheet.

8. The condensing boiler as claimed in claim 7, wherein the cross-section of each corrugation also comprises two further straight sides extending from the flat portion to the first level of the sheet, such that the cross-section is in the shape of a trapezium.

9. The condensing boiler of claim 7, wherein, in between the corrugations, the cross-sections of the sheets are substantially flat.

10. The condensing boiler of claim 1, wherein the first and second sheets are metallic.

11. The condensing boiler of claim 1, wherein the boiler is substantially in the form of a cylinder and comprises 3 such cassettes stacked adjacent a first side of the cylinder and 3 such cassettes stacked adjacent a second opposite side of the cylinder.

12. The condensing boiler of claim 1, wherein the second sheet of the cassette also has corrugations along a length of the second sheet so as to form a number of grooves extending across a width of the second sheet.

13. The condensing boiler according to claim 1, wherein a first fluid flow connector is connected to a first end of the first fluid flow cassette, and a second fluid flow connector is connected to a second, opposite end of the first fluid cassette, such that fluid sent via the first connector flows along the first cassette from the first fluid connector to the second fluid connector, and wherein the second fluid flow connector is arranged to reverse the flow of the fluid such that the fluid is able to flow out of the first fluid flow cassette and in one direction, through the second fluid flow connector and the flow into the second fluid flow cassette in substantially the opposite direction.

14. A condensing boiler including a heat exchanger,
wherein the heat exchanger comprises at least a first and second set of cassettes, the cassettes within each set of cassettes in fluid communication with each other via a number of fluid flow connectors, at least one of the at least first and second set of cassettes including at least a first fluid flow cassette and a second fluid flow cassette, each fluid flow cassette comprising first and second sheets, at least one of the number of the fluid flow connectors further connecting a fluid flow passageway in the first fluid flow cassette to a fluid flow passageway in the second fluid flow cassette, wherein a first fluid flow connector is connected to a first end of the first fluid flow cassette, and a second fluid flow connector is connected to a second, opposite end of the first fluid cassette, such that fluid sent via the first connector flows along the first cassette from the first fluid flow connector to the second fluid flow connector, and wherein of the second fluid flow connector is arranged to reverse the flow of the fluid such that the fluid is able to flow out of the first fluid flow cassette in one direction, through the second fluid flow connector and then flow into the second fluid flow cassette in substantially the opposite direction, wherein at least each of the first sheets has corrugations along a length of the sheet so as to form a number of grooves extending across a width of the sheet, wherein each of the second sheets is attached against the first sheet so as to enclose the grooves to form a number of fluid flow passageways extending across a width of the fluid flow cassette in between the first and second sheets, and wherein each fluid flow cassette is substantially curved across its width such that the fluid flow passageways are substantially curved along their length.

15. The condensing boiler as claimed in claim 14, wherein the heat exchanger further comprises a third fluid flow cassette, and wherein the fluid flow connectors are arranged to reverse the flow of the fluid flowing out of the second fluid flow cassette such that the fluid flows out of the second fluid flow cassette in a direction and flows into the third fluid flow cassette in substantially the opposite direction.

16. The condensing boiler as claimed in claim 14, wherein each cassette is curved with a constant radius of curvature so as to form part of a curved side of a cylinder.

17. The condensing boiler as claimed in claim 14, wherein the width of each fluid flow cassette corresponds to approximately half the circumference of the curved cylinder side.

18. The condensing boiler as claimed in claim 17, wherein the width of each fluid flow cassette corresponds to between 100% and 80% of half the circumference of the curved cylinder side.

19. The condensing boiler of claim 14, wherein the corrugations each comprise a cross-section with a substantially flat portion at a second level, the second level being offset from a first, non-corrugated level of the sheet.

20. The condensing boiler as claimed in claim 19, wherein the cross-section of each corrugation also comprises two further straight sides extending from the flat portion to the first level of the sheet, such that the cross-section is in the shape of a trapezium.

21. The condensing boiler of claim 19, wherein, in between the corrugations, the cross-sections of the sheets are substantially flat.

22. The condensing boiler of claim 14, wherein the first and second sheets are metallic.

23. The condensing boiler of claim 14, wherein the boiler is substantially in the form of a cylinder and wherein the first set of cassettes comprises 3 such cassettes stacked adjacent a first side of the cylinder and wherein the second set of cassettes comprises 3 such cassettes stacked adjacent a second opposite side of the cylinder.

24. A method of manufacturing a heat exchanger unit or condensing boiler comprising a heat exchanger within the heat exchanger unit, wherein the heat exchanger comprises at least first, second and third fluid flow cassettes with each fluid flow cassette comprising first and second sheets, the method comprising the following steps:

providing a first sheet for each fluid flow cassette with corrugations along its length so as to form a number of grooves extending across a width of the sheet, and attaching a second sheet against the first sheet so as to form each fluid flow cassette and to enclose the grooves to form a number of fluid flow passageways extending across a width of each fluid flow cassette in between the first and second sheets, wherein each fluid flow cassette is substantially curved across its width such that the fluid flow passageways are substantially curved along their length, wherein the first cassette and the third cassette are configured to abut a first end of the heat exchanger unit and wherein the second cassette is configured to abut a second, opposite end of the heat exchanger unit, wherein the gas to be cooled by the heat exchanger flows along a length of the heat exchanger in a gap between the first and second fluid flow cassettes in a first direction and between the second and third cassettes in a second opposite direction and wherein gas flow is reversed around the second cassette.

25. A method of manufacturing a heat exchanger or condensing boiler wherein the heat exchanger comprises at least a first and second set of cassettes, the cassettes within each set of cassettes in fluid communication with each other via a number of fluid flow connectors, each one of the at least first and second set of cassettes including a first fluid flow cassette and a second fluid flow cassette with each fluid flow cassette comprising first and second sheets, and the number of fluid flow connectors further connecting a fluid flow passageway in a first fluid flow cassette to a fluid flow passageway in a second fluid flow cassette, wherein the fluid flow connectors are arranged to reverse the flow of the fluid such that the fluid is able to flow out of the first fluid flow cassette in one direction, through a fluid flow connector and then flow into a second fluid flow cassette in substantially the opposite direction, the method comprising the following steps:

providing a first sheet in each fluid flow cassette with corrugations along its length so as to form a number of grooves extending across a width of the sheet, and attaching a second sheet against the first sheet so as to form each fluid flow cassette and to enclose the grooves to form a number of fluid flow passageways extending across a width of each fluid flow cassette in between the first and second sheets, wherein each fluid flow cassette is substantially curved across its width such that the fluid flow passageways are substantially curved along their length.

* * * * *